No. 750,165. PATENTED JAN. 19, 1904.
J. F. CARR.
FAN ACTUATING MECHANISM.
APPLICATION FILED APR. 30, 1902.
NO MODEL. 2 SHEETS—SHEET 1.

WITNESSES:

INVENTOR
Joseph F. Carr
BY
ATTORNEYS

No. 750,165. PATENTED JAN. 19, 1904.
J. F. CARR.
FAN ACTUATING MECHANISM.
APPLICATION FILED APR. 30, 1902.
NO MODEL. 2 SHEETS—SHEET 2.

INVENTOR
Joseph F. Carr

No. 750,165. Patented January 19, 1904.

UNITED STATES PATENT OFFICE.

JOSEPH F. CARR, OF COUSHATTA, LOUISIANA.

FAN-ACTUATING MECHANISM.

SPECIFICATION forming part of Letters Patent No. 750,165, dated January 19, 1904.

Application filed April 30, 1902. Serial No. 105,360. (No model.)

*To all whom it may concern:*

Be it known that I, JOSEPH F. CARR, a citizen of the United States, and a resident of Coushatta, in the parish of Red River and State of Louisiana, have invented a new and Improved Fan-Actuating Mechanism, of which the following is a full, clear, and exact description.

This invention relates to a class of actuating mechanism driven by the descent of an attached weight, and has for its object to provide novel simple details of construction for an apparatus of the character indicated which adapt it for the vibration of a plurality of fans connected therewith.

The invention consists in the novel construction and combination of parts, as is hereinafter described, and defined in the appended claim.

Reference is to be had to the accompanying drawings, forming a part of this specification, in which similar characters of reference indicate corresponding parts in all the figures.

Figure 1:
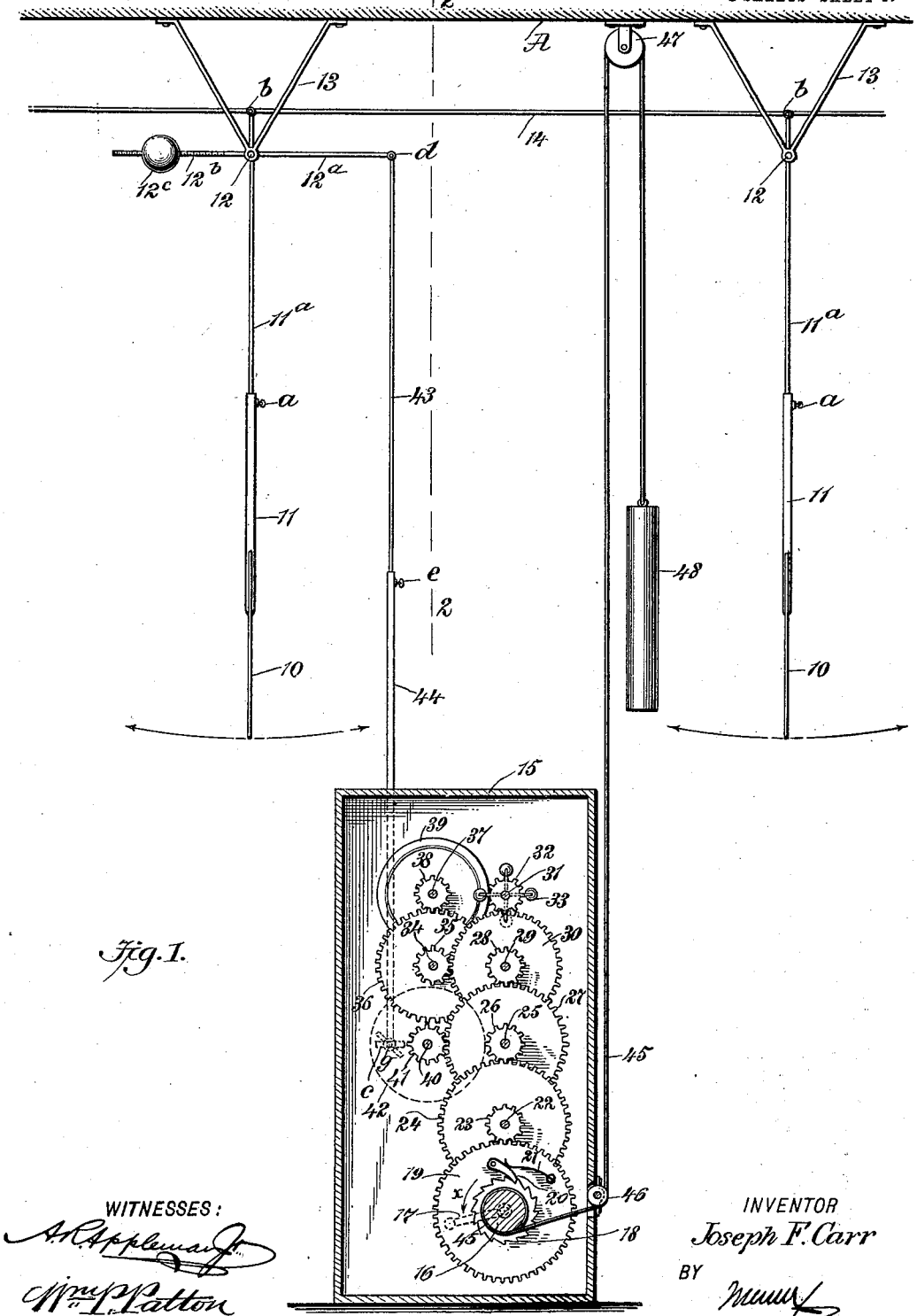
Figure 2:
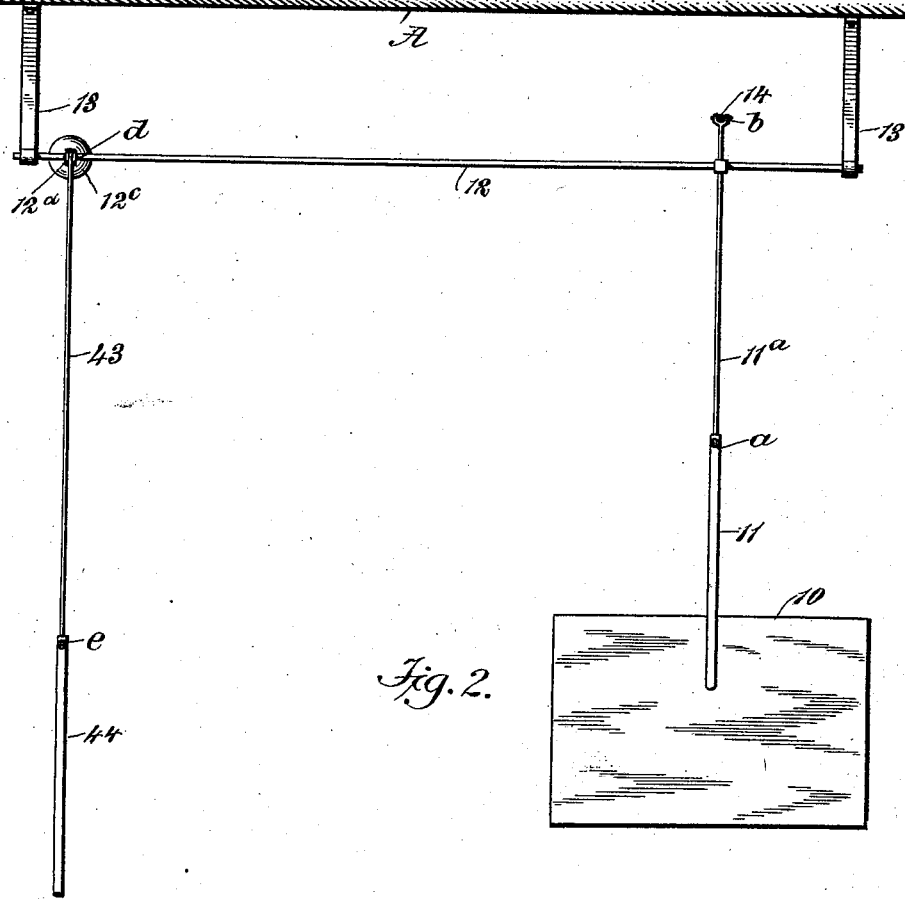
Figure 3:
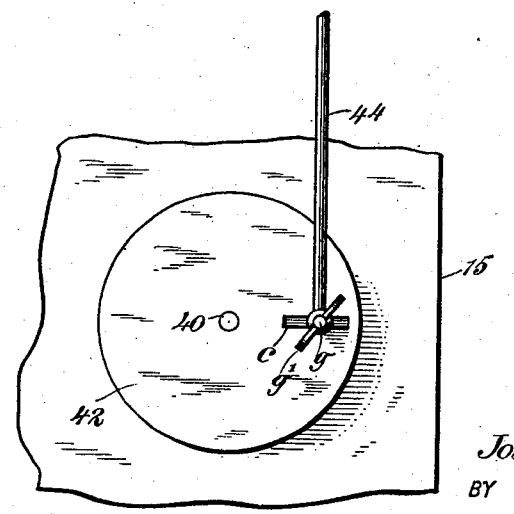

Figure 1 is a side view of the fan mechanism and of a motor applied for actuating said mechanism. Fig. 2 is a transverse sectional view of the fan mechanism substantially on the line 2 2 in Fig. 1, and Fig. 3 is an enlarged side view of a crank-disk and a connecting-rod in part which are portions of the motor device employed.

In carrying into effect the features of the invention any desired number of fans 10, each consisting of a preferably flat blade having suitable area, are provided, each fan-blade having its top portion at the transverse center rigidly attached to a tubular stem 11, from which extends an arm 11ª, held adjustably connected therewith by telescopic engagement and a set-screw $a$. The arms 11ª of a set of fans 10 are secured near their upper ends upon rock-shafts 12, journaled near their ends in hanger-brackets 13, depending from a ceiling A or equivalent support, said shafts 12 being thus disposed transversely of a room to be cooled by the fans and at proper distances apart in parallel planes.

A connecting-rod 14 is provided which is of sufficient length to extend lengthwise of the room ventilated with the fans and has a pivoted connection $b$ with the upper extremity of each arm 11ª, that extends above a respective rock-shaft 12, whereby the fans are all connected for simultaneous movement.

The preferred means for effecting the vibration of the fans 10 comprises the following details: In a suitable casing 15 having parallel sides a drum 16 is journaled by its ends in opposite sides of the casing, and on one projecting end of the drum a crank-arm 17 is secured for the rotation of the same. A ratchet-wheel 18 is held to rotate with the drum 16, and at the side of said ratchet-wheel a spur gear-wheel 19 is loosely secured on the drum to be rotated therewith. Upon an adjacent side of the spur-gear 19 the pawl 20 is pivoted, so that the toe of the pawl may engage the teeth of the ratchet-wheel 18, a spring 21, carried by the gear 19, pressing the pawl into engagement with the ratchet-wheel. Above the drum 16 a shaft 22 is journaled in the sides of the casing 15 parallel with the axis of the drum, and upon said shaft a pinion 23 is secured, which meshes with spur-gear 19, a spur-gear 24 of less diameter than the gear 19 being secured on the shaft 22 at one side of the pinion 23. Above the shaft 22, and preferably in the same vertical plane therewith, a second shaft 25 is journaled by its ends in the walls of the casing 15, whereon the pinion 26 is mounted and affixed, so as to mesh with the spur-gear 24, a spur-gear 27 of less diameter than the spur-gear 24 being held on the shaft 25, so as to rotate with it. The relative proportion of the gears 19 24 27 is such that a proper increase in speed is afforded without excessive velocity. In mesh with the spur-gear 27 is a pinion 28, secured on the transverse shaft 29, journaled by its ends in the sides of the casing 15, and on said shaft 29 a spur-gear 30 is held to rotate therewith, the shaft 29 occupying substantially the same vertical plane, with the shafts and drum below it. Upon the transverse shaft 31, journaled in the sides of the casing 15, a pinion 32 is secured, meshing with the spur-gear 30, and upon the shaft 31 the governor device 33 is mounted and adapted to control the speed of revolution of the train of gearing in which the pinion 32 is included. The governor 33 may be of the style shown having movable balls or may be of any other well-known available construction. At one side of and in parallel with the transverse shaft 29 a similar shaft 34 is journaled in the des of the casing 15 and carries the fixed pinion 35, which meshes with the spur-gear 30, and on the shaft 34 a spur-gear 36 is mounted and affixed. Above the shaft 34 a like transverse shaft 37 is journaled in the side walls of the casing 15 and carries a fixed pinion 38, which meshes with the spur-gear 36, and upon the shaft 37 a balance-wheel 39 is also mounted and secured. In parallel with the shaft 25 and below the shaft 34 the cross-shaft 40 is journaled in the sides of the casing 15 and carries a fixed pinion 41, in mesh with the spur-gear 27, fixed on the shaft 25. The shaft 40 projects from the casing 15 at one side, and on this projected end a crank-disk 42 is secured, said crank-disk having a radial slot $c$ formed in it. Upon one of the rock-shafts 12 a rock-arm $12^a$ is mounted between its ends, so as to communicate motion to the shafts, one end of the rock-arm having pivoted engagement, as at $d$, with the upper end of an upright pusher-rod comprising two telescoping members 43 44, the upper member 43 preferably being slidably engaged within the tubular lower member 44. The engaged portions of the pusher-rod members 43 44 are held intact at any desired point, to be determined by the distance between the horizontal planes of the rock-shaft 12 and cross-shaft 40, by a set-screw $e$. The lower end of the pusher-rod member 44 is pivoted upon the disk 42 by a bolt $g$, that engages the slot $c$ in said disk, a clamping-nut $g'$, that screws upon one end of the pivot-bolt $g$, serving to hold the bolt at any preferred point of adjustment in the slot $c$. Upon the portion $12^b$ of the rock-arm that is extended from the shaft 12 oppositely from the portion $12^a$ a thread may be cut, and on said part of the rock-arm a weight-block $12^c$ is mounted and adjustably held by threaded engagement therewith. A flexible connection 45 is secured by one end to the drum 16, upon which a portion of said strand is wrapped, and thence the rope 45 extends to and beneath a loose pulley 46, that is held to rotate at a side of the casing 15, said rope extending upward from the pulley 46 to and over the hanger-pulley 47, fixed upon the ceiling A or other stable support, the lower end of the rope 45 carrying a weight 48.

Assuming that the casing 15 is secured at a suitable point, so that the flexible connection 45 may freely wrap and unwrap on the drum 16 and the weight 48 hang pendent, the operation is as follows: The cord or rope 45 is wound upon the drum 16, so as to fully elevate the weight 48, which will by its gravity turn the drum in the direction of the arrow $x$ in Fig. 1, thus communicating rotary motion to the train of gears above the drum, the speed being increased a suitable degree by the sizes and relative arrangement of the spur-gears and pinions comprising said gear-train, the upper pinion 32 being moved quite fast as compared with the speed of the drum 16 and spur-gear 19.

The governor 33 is adapted to regulate the motion that is transmitted from the spur-gear 30 to the pinion 35 and spur-gear 36, that meshes with the pinion 38 on the shaft 37, rotating the balance-wheel 39, that coacts with the governor device to render the movement of the gearing uniform, and thus adapt the crank-disk 42 to communicate a regular reciprocating movement to the pusher-rod, that in turn vibrates the rock-arm and the rock-shaft 12.

It will be seen that the rocking of the shaft 12 will vibrate the fan 10, that is hung therefrom by the arm $11^a$ and stem 11, and at the same time a longitudinal reciprocation of the connecting-rod 14 is effected, which from its connection, as described, with the arm $11^a$ of the next fan 10 in sequence will simultaneously vibrate said fan.

If the block 48 is heavy enough and the connecting-rod 14 is sufficiently extended, any suitable number of fans 10 may be arranged to receive vibratory motion from the motor device by the means already described, so that agitation of air in the room can be maintained to cool it.

It is obvious that the provision of the counterbalance-weight $12^c$ will compensate for the weight of the two-part pusher-rod 43 44, which will economize the power afforded by the descent of the weight-block 48 and facilitate the operation of the motor device.

The provision of means for adjusting the length of the arms that carry the fan-blades 10 is advantageous, as it enables the regulation for height of the fans, so that a current of air may be produced at different heights from the floor to comply with the requirements in rooms of different heights.

Having thus described my invention, I claim as new and desire to secure by Letters Patent—

In mechanism of the character described, the combination of a plurality of rock-shafts, an arm pendent from each shaft, and provided at its lower end with a fan, said arms each having a portion extending above its shaft, and a horizontal rod movably connecting said portions, an arm carried by one of these shafts, and provided at one end with an adjustable weight, a mechanism comprising a drum, a motor, a crank-disk and a governor, said crank-disk having a radial slot therein, a pusher-rod pivotally connected at its upper end to the weighted arm, and having its lower end in similar connection with said crank-disk, at the slot therein, and a cord for winding upon said drum, extending over a guide, and provided with an operating-weight, substantially as shown and described.

In testimony whereof I have signed my name to this specification in the presence of two subscribing witnesses.

JOSEPH F. CARR.

Witnesses:
J. A. SMITH,
S. J. PROTHRO.